(12) United States Patent
Gillet et al.

(10) Patent No.: US 10,906,229 B2
(45) Date of Patent: *Feb. 2, 2021

(54) INJECTION DEVICE FOR A FORMING AND FILLING STATION ADAPTED FOR CIP

(71) Applicant: DISCMA AG, Zürich (CH)

(72) Inventors: Denis Gillet, Octeville sur Mer (FR); Michele Ollari, Octeville sur Mer (FR); Roberto Zoni, Octeville sur Mer (FR); Massimo Nascimbeni, Octeville sur Mer (FR)

(73) Assignee: DISCMA AG, Zürich (CH)

( * ) Notice: Subject to any disclaimer, the term of this patent is extended or adjusted under 35 U.S.C. 154(b) by 235 days.

This patent is subject to a terminal disclaimer.

(21) Appl. No.: 16/077,274

(22) PCT Filed: Feb. 10, 2017

(86) PCT No.: PCT/EP2017/053073
§ 371 (c)(1),
(2) Date: Aug. 10, 2018

(87) PCT Pub. No.: WO2017/137603
PCT Pub. Date: Aug. 17, 2017

(65) Prior Publication Data
US 2019/0030779 A1    Jan. 31, 2019

(30) Foreign Application Priority Data

Feb. 11, 2016 (EP) .................................. 16305157

(51) Int. Cl.
*B29C 49/42* (2006.01)
*B29C 49/46* (2006.01)
*B29C 49/06* (2006.01)

(52) U.S. Cl.
CPC .......... *B29C 49/4289* (2013.01); *B29C 49/46* (2013.01); *B29C 49/06* (2013.01); *B29C 2049/4664* (2013.01)

(58) Field of Classification Search
None
See application file for complete search history.

(56) References Cited

U.S. PATENT DOCUMENTS

| | | | |
|---|---|---|---|
| 10,625,460 B2 * | 4/2020 | Gillet | B29C 49/4289 |
| 2011/0300249 A1 | 12/2011 | Andison et al. | |
| 2013/0280127 A1 | 10/2013 | Voth | |
| 2016/0354966 A1 | 12/2016 | Gillet | |

FOREIGN PATENT DOCUMENTS

| | | |
|---|---|---|
| EP | 2823948 A1 | 1/2015 |
| EP | 2883800 A1 | 6/2015 |

* cited by examiner

*Primary Examiner* — Monica A Huson
(74) *Attorney, Agent, or Firm* — Eric J. Sosenko; Jonathan P. O'Brien; Hongiman LLP

(57) ABSTRACT

An injection device for injecting a pressurized liquid into a preform and forming a container. The injection device including a piston device having a piston body and a piston head arranged to reciprocate in the piston body and to fluidly isolate an inner chamber of the piston device. The piston body having a recess portion defining a location where the piston head is not in liquid tight contact with the piston body such that liquid can flow from the inner chamber to a part of the piston body on an opposite the inner chamber. The injection device being arranged for driving the piston head in the recess portion in a clean-in-place (CIP) configuration.

15 Claims, 5 Drawing Sheets

INJECTION DEVICE FOR A FORMING AND FILLING STATION ADAPTED FOR CIP

TECHNICAL FIELD OF THE INVENTION

The invention relates to the field known as hydroforming, of forming containers from preforms using a liquid to deform the preforms and fill the obtained containers with said liquid.

The invention relates to an injection device for a forming and filling station for forming a preform into a container and filling said container using a pressurized liquid.

The invention also relates to a method for forming a preform into a container and filling said container using a pressurized liquid.

BACKGROUND

A traditional injection device comprises a piston device including an inner chamber wherein the liquid is pressurized, and an injection head, or injection nozzle, fluidicly connected to the piston device. A connection duct communicates the pressurized liquid from an outlet port of the inner chamber toward the injection nozzle. When the injection device is part of a hydroforming station, the injection device is designed to inject the liquid at a predetermined pressure profile and flow rate adapted to urge a preform against the wall of a mold cavity having the shape of the container to be produced. Advantageously, the injected liquid is the end product to be contained in the formed container.

Hygiene is a very important criteria in all transition and all production steps to guaranty consumer safety from direct food contact point of view in case of beverage or skin contact for non-food products. For that purpose, prior any production, a cleaning in place (CIP) cycle is conducted. Such CIP is also done at regular intervals during the production phases. The CIP cycle may vary according to the type of product that is produced and according to the producer specification. It is important that during this cycle, a turbulent flow can be created in order to remove any residual contaminant or micro-organism for any area of the injection device in contact with the forming product. A specific care is to be taken on seals and gaskets in order to make sure that cleaning product flow reaches all the recesses and parts in contact with the product.

WO-2014/173870 describes an injection device. A piston head is placed in a cleaning position wherein the sealing periphery of a piston is separated from the wall of the piston chamber by a cleaning space. In this manner, the cleaning product can flow all around the piston head and more particularly clean the sealing gasket extending around the piston head. The recess portion is placed in an upper part of the piston body, i.e. above the piston head, where the liquid to be injected in the preform does not flow. The described injection device has an injection configuration wherein the body of the injection head slides in a liquid tight manner along the wall of the piston chamber as to push liquid through the outlet.

One drawback of the described injection device is that the tightness between the piston head and the piston chamber cannot be improved by a sealing gasket having lips oriented towards the inner chamber. There is a risk of damaging and/or misplacing the lip of the sealing gasket when the piston head is moved from the CIP configuration, wherein the piston head is placed in the recess portion, to a production configuration, wherein the piston head is in liquid tight contact with the piston body, because this movement is done in the direction of the orientation of the lip. Consequently, the lip can be turned upside down during this movement when it enters in contact with the piston body.

Another drawback of the injection device described in WO-2014/173870 is that evacuating bubbles from the liquid to be injected requires using a different liquid circuit than the liquid circuit used for injecting said liquid. The inlet of the described injection device connects the injection device at the uppermost area of the injection device. The outlet connects the inner chamber at the lowermost area of the inner chamber. Consequently, evacuating bubbles from the liquid to be injected would need a specific purge configuration as to reverse the circulation of the liquid and evacuate bubbles through the uppermost area. Then, switching from the purge configuration to the normal injection configuration would take time.

EP-2883800 discloses a piston device comprising an inlet through which said device can receive liquid, an outlet through which said device can inject said pressurized liquid, a main body defining an inner chamber and an upstream duct placing the inner chamber in fluidic communication with the inlet, a valve comprising a valve plate movable along a plate actuation path. The plate actuation path extends at least in part inside the upstream duct. EP-2883800 also discloses an actuation chamber comprising a cleaning area having a diameter greater than the diameter of an actuation piston connected to the valve plate, said actuation piston being placed in said cleaning area in the cleaning position of the valve plate such that liquid flowing in the actuation chamber is able to flow around the actuation piston. However, as the injection device described in WO-2014/173870, the tightness between the piston head and the inner chamber cannot be improved by a sealing gasket having lips oriented towards the inner chamber.

EP-2823948 discloses a device for simultaneously forming and filling a container from a preform comprising an injection nozzle and an injection device comprising a piston device. The injection nozzle and the housing of the injection device are rigidly fixed to each other such as to form a single unit in order to facilitate the CIP. During a cleaning phase, the piston head is maintained in an uppermost position in which the sealing periphery of the piston is in tight contact with the wall of a piston chamber.

In this position, a sealing gasket cannot be properly cleaned and hygiene is not guaranteed once the piston head moves upward and downward against the wall of the piston chamber during the injection phase.

US 2013/0280127 discloses a blow molding machine with CIP system, including a plurality of blow molding stations and valve blocks configured such that they can be included in the CIP process.

This machine is not adapted for both forming and filling a container and the problem of properly cleaning a piston device is not addressed.

US-2011/0300249 discloses a device for simultaneously forming and filling a container from a preform comprising a pressure source adapted to urge liquid toward the preform, for example a piston device comprising a piston head and a piston body. The piston device is in the same configuration as the one disclosed in EP-2823948. Therefore, the device disclosed in US-2011/0300249 is neither adapted for a proper cleaning nor for limiting the wear of an optional sealing gasket extending around the piston head.

One of the aims of the invention is to provide an injection device that minimizes the CIP time providing a very efficient cleaning, with a minimized amount of cleaning product, and to solve or reduce one of the above drawbacks, like providing an injection device wherein the CIP does not damage or cause an excessive wear of an optional sealing gasket of the piston head.

SUMMARY OF THE INVENTION

To this end, the invention relates to an injection device for a forming and filling station for forming a preform into a container and filling said container using a pressurized liquid the injection device comprising:
- at least one injection head for injecting the pressurized liquid into the preform, and
- at least one piston device having a piston body, and a piston head arranged to reciprocate in the piston body along a piston axis, the piston head cooperating in a liquid tight manner with a sealing portion of the piston body as to fluidicly isolate an inner chamber of the piston device, the piston body having an inlet duct intended to be in fluidic communication with a liquid source for admitting liquid into the inner chamber and at least one outlet duct placing the inner chamber in fluidic communication with the injection head, the piston body comprising a recess portion wherein the piston head is not in liquid tight contact with the piston body such that liquid can flow from the inner chamber to a part of the piston body extending on the side of the piston head opposite the inner chamber, the injection device being arranged for driving the piston head in said recess portion in a CIP configuration,
- wherein the recess portion extends within the inner chamber, in an axial side of the sealing portion extending in the injection direction.

Such an injection device makes it possible to improve the tightness of the seal between the piston head and the sealing portion for high pressure injection, by using a sealing gasket having a lip oriented toward the inner chamber. As, according to the invention, the recess portion is arranged in the axial side of the sealing portion extending in the injection direction, the movement of moving the piston head from a position facing the recess portion to a position where the piston head cooperates with the sealing portion is done in a direction opposite the injection direction and consequently opposite the orientation of the lip. In this manner, the lip cannot be turned upside down during this movement. That particular orientation of the gasket lip allows a large movement of the piston head in the CIP configuration. The piston head is not limited to reciprocate within the CIP recess area. The course of the piston head during the CIP phase or configuration can extend, if necessary, all along or along the sum of the CIP recess and the sealing portion. This allows providing very strong liquid turbulences and increases the cleaning efficiency.

According to another feature of the injection device according to particular embodiments of the invention, the recess portion is an annular groove extending around the inner chamber and locally enlarging the radial dimension of said inner chamber measured perpendicularly to the piston axis.

For example, the annular groove is coaxial to the piston axis.

According to another feature of the injection device according to particular embodiments of the invention, the height of the periphery of the piston head measured along the piston axis is inferior than the height of the recess portion measured along the piston axis.

This arrangement allows making sure that the cleaning liquid is able to flow all around the piston head when said piston head is placed in the recess portion.

According to a particular feature of the injection device, the piston head comprises a sealing gasket ensuring liquid tight contact between the piston head and the sealing portion, said sealing gasket comprising a lip oriented towards the inner chamber, such that the lip can be applied against the sealing portion without being turned over when the piston head is moved from the recess portion back to the sealing portion.

As explained above, the invention allows making sure that the sealing gasket will not be damaged or worn prematurely during the CIP process.

According to another feature of the injection device according to particular embodiments of the invention, the inlet duct and the outlet duct respectively define an inlet port and an outlet port in a wall of the inner chamber Advantageously, such an injection device makes it possible to have a liquid circulation from the inlet to the outlet through the inner chamber in order to purge potential bubbles from the liquid to be injected. Consequently, the injection device comprises less special liquid circuit for purging bubbles.

According to another feature of the injection device according to particular embodiments of the invention, the outlet port opens into said recess portion.

This arrangement is particularly advantageous in that it reduces the space requirement for the piston body along the piston axis since there is no need to have a space in the inner chamber for the outlet ports and another space for the recess portion.

According to other features of the injection device:
- the piston head is designed to occupy an extreme down sealed position with respect to the piston body during reciprocation, the inner chamber having a volume that is minimal when the piston head is in said extreme down sealed position, wherein at least one of the inlet port or the outlet port opens at a lowermost area of the inner chamber and at least another of said inlet port (58) or outlet port is located at an uppermost area of the inner chamber when the piston head is in said extreme down sealed position; and
- at least one outlet port is located at an uppermost area of the inner chamber when the piston head is in said extreme down sealed position.

Placing the inlet port at a lowermost area of the inner chamber and the outlet port at an uppermost area of the inner chamber improves the evacuation of air when the inner chamber is first filled with liquid. Placing the outlet port at the highest point of the inner chamber helps the air bubbles escape the inner chamber. Consequently, the air purge can be performed efficiently and with a minimal liquid loss.

According to a particular feature of the injection device, the piston body comprises at least two outlet ducts placing the inner chamber in fluidic communication with the injection head, each outlet port of said outlet ducts being centred on an outlet port centre, wherein all the outlet port centres extend in the same radial planes of the inner chamber, at the same distance from the piston axis and are arranged angularly in a regular manner around the piston axis, the angle formed by two successive outlet ports with the piston axis being constant.

The inventors have discovered that the speed of the pressurized liquid flowing through the outlet ducts creates a dynamic effect having a dynamic impact on the reaction force exerted by the liquid on the piston head. The inventors have discovered that placing the outlet ports equally distributed around the piston head makes said various dynamic impacts at each outlet port compensated by each other. Consequently, the resultant mechanical effort imparted on the piston head by the liquid in the inner chamber is applied in a direction substantially parallel to the piston axis or substantially equal to zero. This greatly reduces the risks of wearing the sealing gasket of the piston head since said piston head is no longer urged laterally toward the piston body.

Consequently, the invention makes it possible to preserve the sealing gasket during the CIP as well as during the production of containers.

According to other features of the injection device according to particular embodiments of the invention:
  the injection device further comprises a first auxiliary duct intended to place the injection head in fluidic communication with the liquid source; and
  the injection device further comprises a second auxiliary duct intended to place the part of the piston body extending on the side of the piston head opposite the inner chamber with the liquid source.

The auxiliary ducts offer different CIP circulations of cleaning product, which allows making sure that every parts of the injection device can be cleaned during the CIP.

The invention also relates to a method for cleaning an injection device as described above, comprising the following steps:
  placing a liquid source containing a cleaning product in fluidic communication with the inner chamber via the inlet duct,
  reciprocating the piston head in the piston body to circulate the cleaning product from the liquid source to the injection head,
  characterized in that the method further comprises a step of placing the piston head in the recess portion such that the cleaning product can flow from the inner chamber to a part of the piston body extending on the side of the piston head opposite the inner chamber.

As explained previously, the method according to the invention allows providing very strong liquid turbulences and increases the cleaning efficiency while preserving the sealing gasket of the piston head.

According to other features of the injection device according to particular embodiments of the invention:
  a dummy container is placed in fluidic communication with the outlet of the injection head and with the liquid source such that the cleaning product flowing through the outlet flows back to the liquid source via the dummy container;
  the method further comprises a step of circulating the cleaning product from the liquid source back to the liquid source via the inner chamber, the injection head and the first auxiliary duct; and
  the method further comprises a step of circulating the cleaning product from the liquid source back to the liquid source via the inner chamber, the part of the piston body extending on the side of the piston head opposite the inner chamber and the second auxiliary duct.

BRIEF DESCRIPTION OF THE DRAWINGS

Other aspects and advantages of the invention will appear upon reading the following description, given by way of example and made in reference to the appended drawings, wherein.

DETAILED DESCRIPTION OF THE INVENTION

In the application, "liquid" has a physical meaning. It designates any substantially incompressible medium able to flow. The liquid can have a low viscosity (like water or alcohol), a medium viscosity (like eatable oil or soup), or a high viscosity (like yoghurt or creamy product). The liquid can be homogeneous or not homogeneous (including fruit pulp or bits of foodstuff). It is not limited to foodstuff. The liquid may be for example water, or other beverages, body care products, home and garden care products, medical fluids, fuels, operating fluids, and the like.

In the application, the terms "upstream" and "downstream" are defined with respect to the direction of the flow of liquid circulating in the injection device from a liquid source to a preform.

Figure 1:
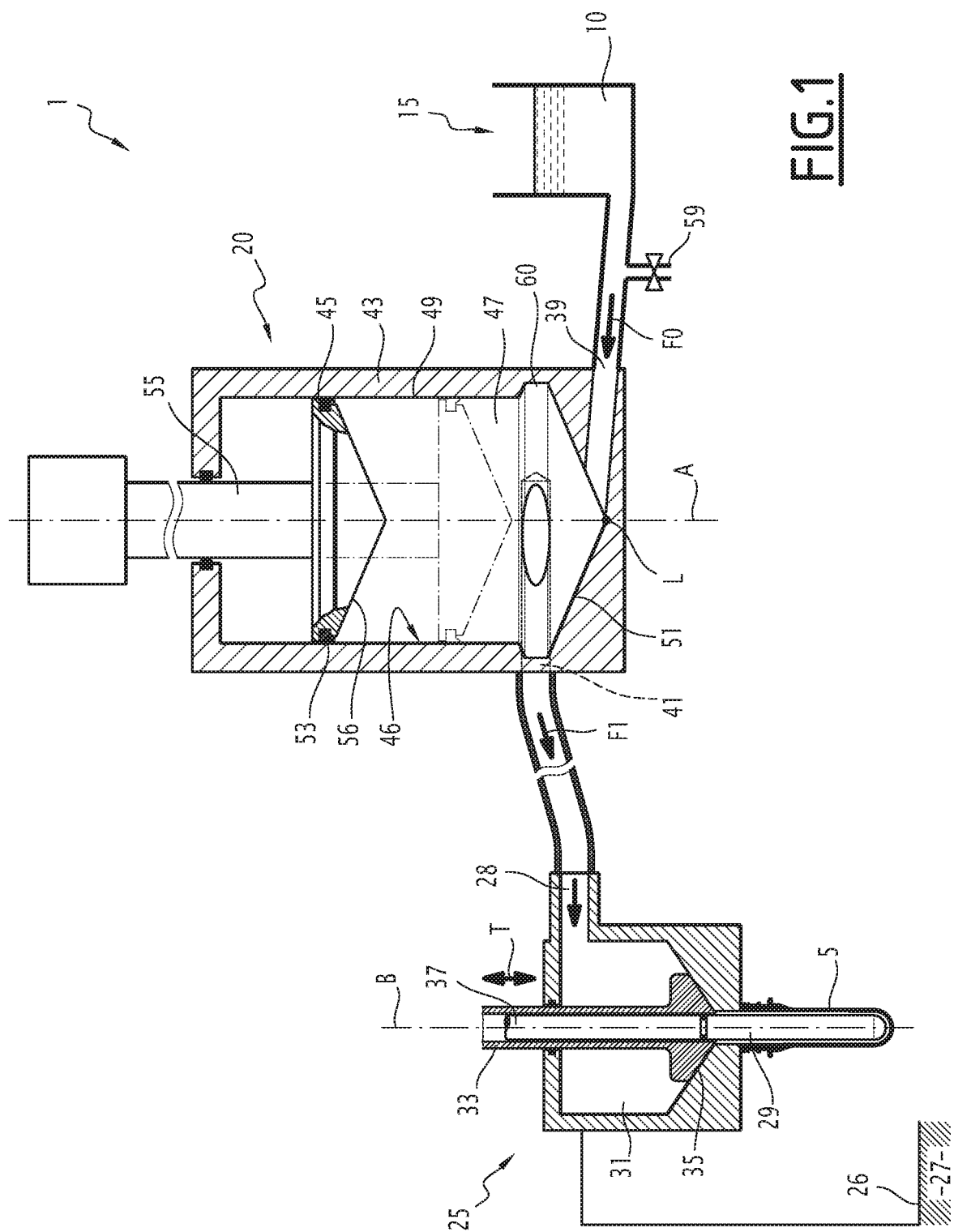
FIG. 1 is a diagrammatical axial cross-section view of an injection device according to a first embodiment the invention.
Figure 6:
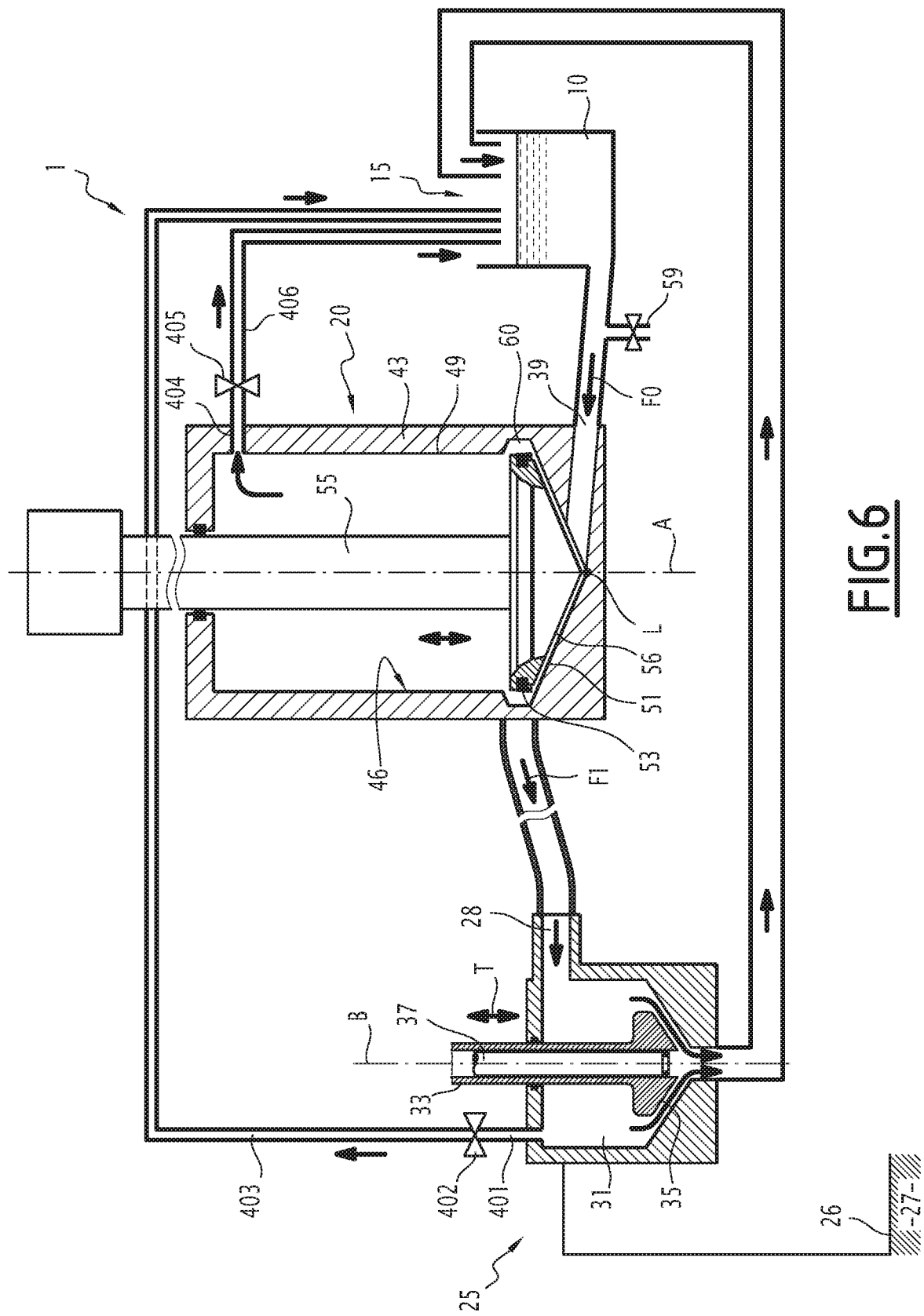
FIG. 6 is a diagrammatical axial cross-section view of a piston device of FIG. 1, the piston head being placed in a CIP configuration.

Referring to FIGS. 1 and 6, there is described an injection device 1 according to a first embodiment of the invention. The injection device 1 is included in a forming and filling station for forming a preform 5 into a container and filling said container using a liquid 10. The forming and filling station further comprises a mold cavity (not shown).

The injection device 1 mainly comprises a liquid source 15 for providing the liquid 10, a piston device 20 for pressurizing the liquid, and an injection head 25 for injecting the liquid into the preform 5. The injection device 1 also comprises a base 26 intended to be in horizontal contact with a floor 27.

The liquid source 15 and the injection head 25 are conventional in this type of station and will not be described in great detail herein. In particular, the injection head can move vertically.

The liquid source 15 is for example a reservoir (shown in FIGS. 1 and 6).

The injection head 25, or injection nozzle, comprises an inlet 28, and an outlet 29. The injection head 25 defines an injection chamber 31 extending between the inlet 28 and the outlet 29. The injection head 25 further includes a hollow control rod 33 extending in the chamber 31 along an injection axis B.

The outlet 29 is adapted to be in fluidic communication with the preform 5, to fill the preform with the liquid coming from the inlet 8.

The injection chamber 31 defines an inner volume temporarily receiving the liquid to be injected in the preform 5 via the outlet 29.

The injection axis B is preferably substantially perpendicular to the base 26, that is to say substantially vertical in the example.

The hollow control rod 33 comprises a sealing ring 35 at its end extending in the chamber 31. The hollow control rod 33 is movable in translation along the injection axis B in the chamber 31 between a sealing position, shown in FIG. 1, wherein the sealing ring 35 is applied against a wall of the chamber 31 and hermetically closes the chamber 31, and an injecting position, wherein the sealing ring 35 is spaced apart from said wall and wherein the outlet 29 is in fluidic communication with the inlet 28 via the chamber 31.

In the case of hydraulic forming and in a conventional manner, a stretch rod 37 optionally extends inside the hollow control rod 33, passes through the outlet 29 and extends in the preform 5 to assist in the deformation of the preform into a container, as known per se. The stretch rod 37 is movable in translation along the injection axis B in the hollow control rod 33, as shown by an arrow T in FIG. 1.

As a variant, the injection head 25 is implemented without a stretch rod, in which case the control rod 33 does not need to be hollow, and/or with a movable injection nozzle (not represented), adapted to be retracted in order to allow easily moving the preform 5 or the filled container under the injection head, as known per se.

The piston device 20 comprises at least an inlet duct 39, an outlet duct 41, a piston body 43, and a piston head 45 arranged to reciprocate in the piston body along a piston axis A.

For example the piston axis A forms an angle with a vertical direction, the angle being smaller than 30°, preferably smaller than 10°.

The piston axis A is for example substantially parallel to the injection axis B, that is to say vertical in the example.

The piston body 43 is for example made of a single rigid block or rigid elementary bodies rigidly fixed together, so that the piston body forms a single unit, able to move vertically. In another example, the injection head 25 can move vertically while the piston body 43 is fixed with respect to the base 26, a flexible hose connecting the piston body 43 to the injection head 25.

The piston body 43 is for example formed of a hollow casing. The piston body 43 for example has a square or circular section perpendicularly to the piston axis A, i.e. in a radial plane.

The piston body 43 comprises an internal wall 46. The wall 46 comprises a sealing portion 49 along which the piston head 45 reciprocates in a liquid tight manner. The piston body 43 and the piston head 45 together define an inner chamber 47 for temporarily receiving the liquid to be injected into the preform 5. While the piston head 45 cooperates in a liquid tight manner with the sealing portion 49, said piston head 45 separates the hollow casing of the piston body 43 into two parts, the inner chamber 47 and an evacuation chamber 50, the inner chamber being in the side of the piston head 45 that receives the inlet 39 and the outlet duct 41, the evacuation chamber being in the opposite side of the piston head 45.

The wall 46 comprises the sealing portion 49 along which the piston head 45 reciprocates, and a complementary portion 51, facing the piston head and defining the bottom side of the inner chamber 47.

The sealing portion 49 is cylindrical and extends along the piston axis A.

The complementary portion 51 for example has a conical shape. The complementary portion 51 defines a lowermost area L which, in the example, is the summit of the conical shape.

The piston head 45 comprises a sealing gasket 53 in liquid tight fitting with the sealing portion 49 of the wall 46, and a contact surface 56 intended to be in contact with the liquid intended to be injected in the preform 5. As shown in FIGS. 1, 2, 5 and 7, the contact surface 56 is for example conical and points downwards.

The sealing gasket 53 advantageously includes a lip 57 (FIGS. 2, 5 and 7), for example made of rubber, in order to ensure leak tightness between the piston body 43 and the piston head 45. The lip 57 is oriented towards the complementary portion 51 or toward the lowermost area L, meaning that the lip 57 extends from an end attached to piston head 45 to a free end extending in the inner chamber 47 towards the complementary portion 51, as more particularly visible in FIGS. 2, 5 and 7. The lip 57 has a resilient behaviour which tends to urge the lip 57 against the wall 46 in the sealing portion 49 to ensure liquid tightness between the piston head 45 and the wall 46 in said sealing portion. The lip 57 is arranged such that the liquid tightness improves when the pressure of the liquid increases.

The inner chamber 47 is delimited by the complementary portion 51 of the wall 46, part of the sealing portion 49 of said wall, a recess portion 60 that will be described later, and the contact surface 56 of the piston head 45.

A control rod 55 is attached to the piston head 45 and extends along the piston axis A. The control rod 55 is connected to actuation means, such as a servomotor or other appropriate actuation means, arranged to control the movement of the control rod 55 and hence the movement of the piston head 45 relative to the piston body 43.

Figure 2:
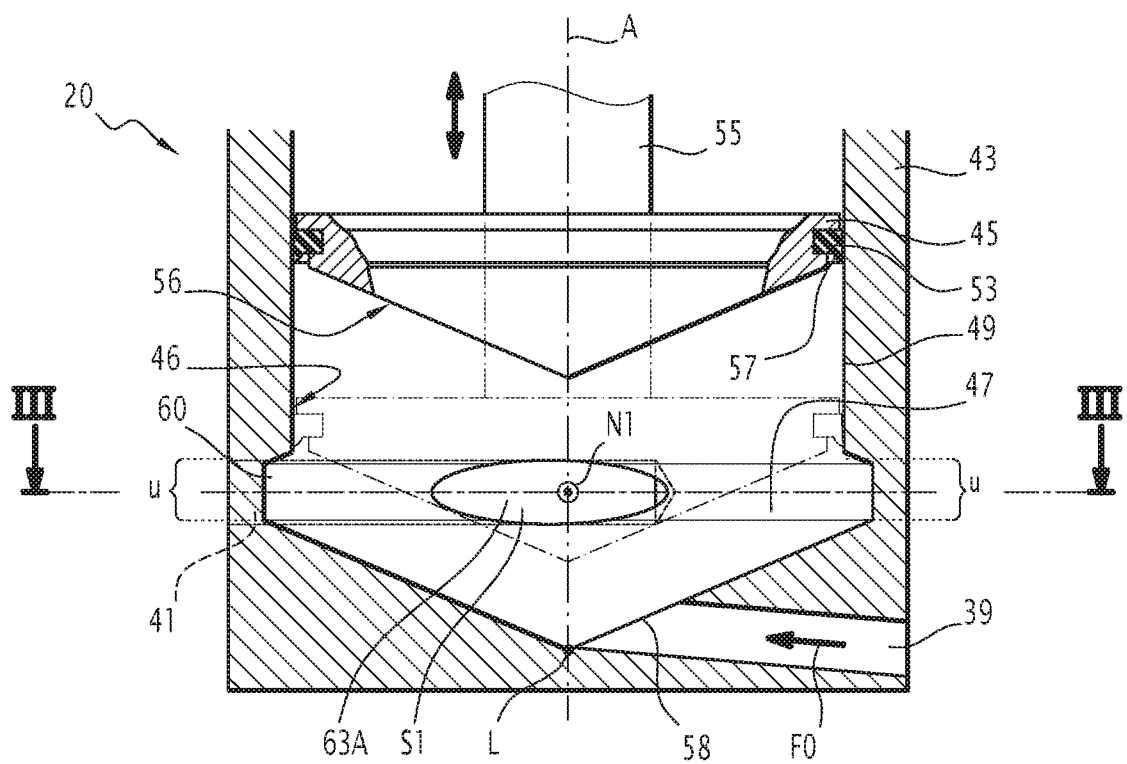
FIG. 2 is a diagrammatical axial cross-section view of the piston device represented in FIG. 1.

The piston head 45 is movable with respect to the piston body 43 along the piston axis A at least between two extreme positions shown in FIG. 2 and corresponding to the injection operation, such that the volume of the inner chamber 47 varies when the piston head 45 moves.

An injection direction is defined as corresponding to the movement of the piston head 45 between the two extreme sealed positions which makes the volume of the inner chamber 47 decreasing. When the injection direction is oriented downwards, the extreme sealed position corresponding to the minimum volume of the inner chamber 47 is an extreme down sealed position of the piston head 45, shown in dotted lines in FIG. 2, because the piston head 45 is brought close to the complementary portion 51. The extreme down sealed position corresponds to a lowermost position of the piston head 45 with respect to the piston body 43 for the injection operation.

In an extreme up sealed position, shown in solid lines, the inner chamber 47 has a maximum volume because the piston head 45 is spaced from the complementary portion 51 thereby enlarging the volume between the contact surface 56 and the complementary portion 51. The extreme up sealed position corresponds to an uppermost position of the piston head 45 with respect to the piston body 43 for the injection operation.

The inlet duct 39 extends between the liquid source 15 and the inner chamber 47 and selectively put them in fluidic communication. The inlet duct 39 opens into the inner chamber 47 and define an inlet port 58 in the wall 46.

The inlet duct 39 further comprises closing means (not represented) adapted to prevent the liquid selectively from flowing back from the inner chamber 47 to the liquid source 15. The inlet duct 39 also comprises a drain system 59 suitable for draining the inner chamber 47, that is to say for extracting the liquid, for example for cleaning purposes.

The inlet port 58 advantageously is located in the lowermost area L of the wall 46. According to the embodiment shown in the figures, the inlet port 58 is therefore located in the complementary surface 51.

The outlet duct 41 extends between the piston device 20 and the inlet 28 of the injection head 25 in order to allow fluidic communication between the inner chamber 47 and the injection chamber 31.

Figure 3:
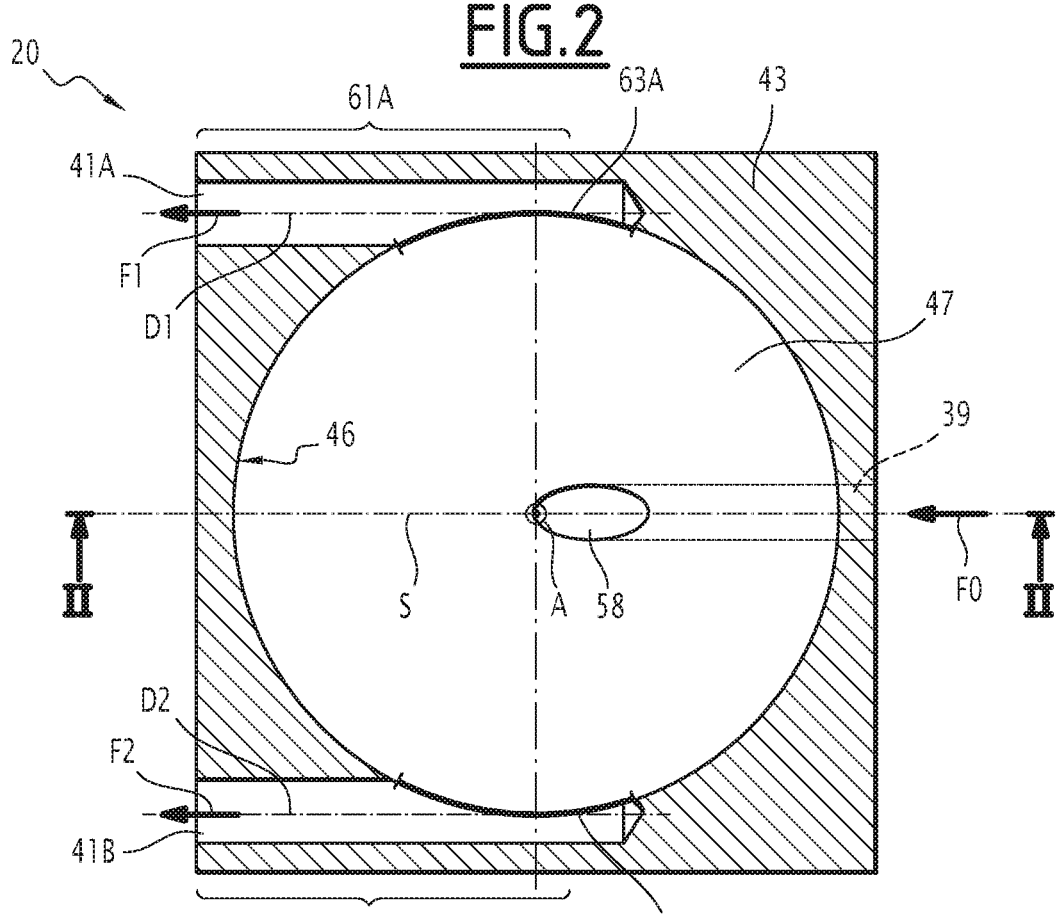
FIG. 3 is a diagrammatical cross-section view of the piston device represented in FIGS. 1 and 2 perpendicularly to the piston axis.
Figure 4:
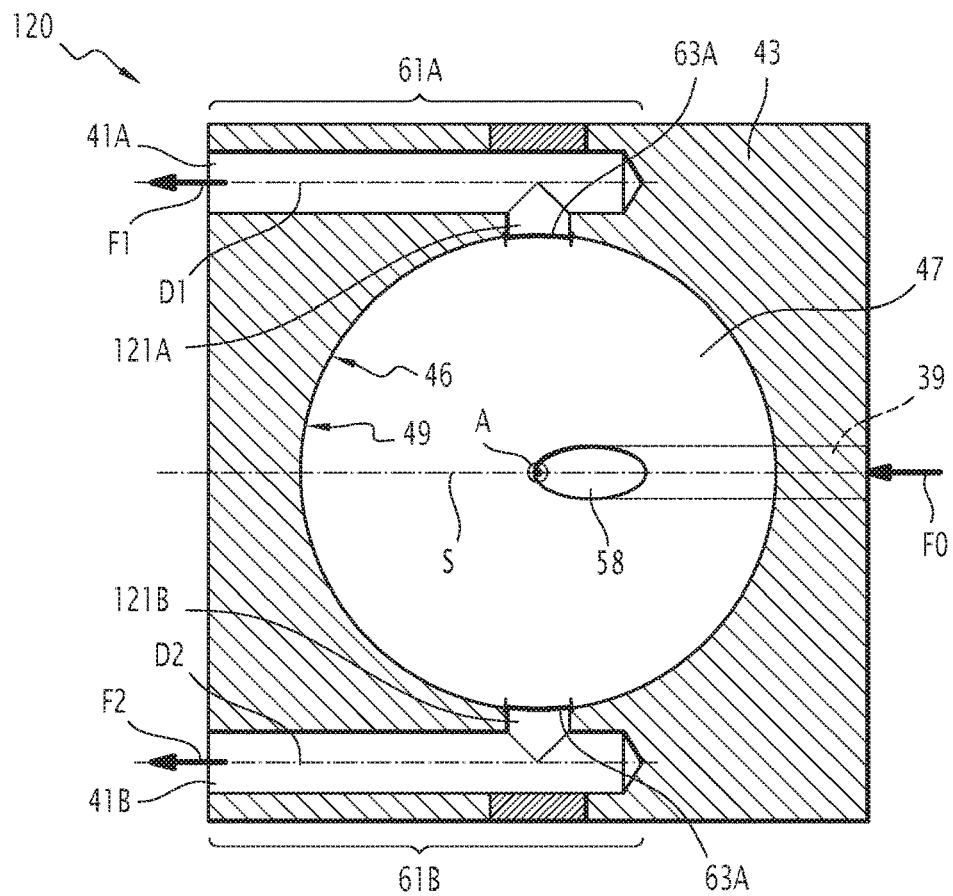
FIG. 4 is a diagrammatical cross-section view, perpendicularly to the piston axis, of a piston device according to a variant of the piston device shown in FIGS. 1 to 3.
Figure 5:
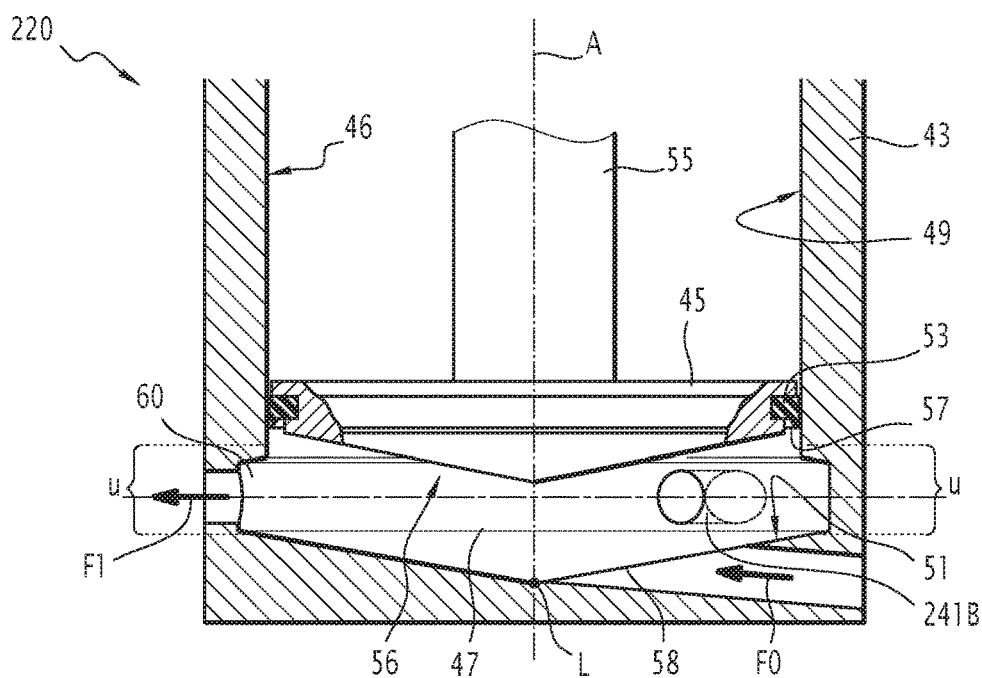
FIG. 5 is a diagrammatical axial cross-section view of a piston device according to a second embodiment the invention.

According to the embodiments shown in FIGS. 3 and 4, the injection device comprises two outlet ducts 41A and 41B.

In the example represented in the figures, the inlet 28 is common to all the outlet ducts 41A, 41B. As a variant (not represented), there are two or more inlets 28.

The outlet ducts 41A, 41B respectively comprise upstream portions 61A, 61B (FIG. 3) which open in the inner chamber 47 and define two outlet ports 63A, 63B in the wall 46. The outlet ports 63A, 63B extend in the sealing portion 49 or in a recess portion 60 described later or in the complementary surface 51. Advantageously, the outlet ports 63A, 63B extend in an uppermost area U of the wall 46 that is just below the piston head 45 when the latter head is in the extreme down sealed position. In other words, the outlet ports 63A, 63B are located below and in the immediate vicinity of the piston head 45 when the latter is in its extreme down sealed position. As explained previously, this position of the outlet ports is advantageous for the air purge operation.

The outlet ports 63A, 63B are each centred on a centre, and are arranged such that all the centres of the outlet ports extend in the same radial planes, i.e. at the same height measured along the piston axis A, at an equal distance from the piston axis A and such that they are angularly regularly distributed around the piston axis (A). By angularly regularly distributed around the piston axis (A), it is meant that the angle formed between two successive outlet ports 63A, 63B and the piston axis (A) in a radial plane is the same for all the ports and is constant, as will be explained subsequently.

Each outlet duct 41A, 41B is respectively configured to generate an equal liquid pressure drop between the outlet port 63A, 63B and the injection head 25 during liquid injection into the preform 5, meaning that all said pressure drops have substantially the same value, as will be explained subsequently. This equal liquid pressure drop can be obtained by appropriately varying the length, the shape of the flow path, and/or the flow section along the flow path, and/or by adjusting some optional flow deflecting element, for each outlet duct to adapt the liquid pressure drop generated by said outlet duct to pressure drop generated by the other duct(s).

The outlet ports 63A, 63B are substantially symmetrical to each other with respect to a symmetry plan (S) containing the piston axis (A). The constant angle formed between the two outlet ports centres is equal to 180°. Consequently, in the case of an inner chamber 47 of circular cross-section, the outlet ports 63A, 63B are diametrically opposed as shown in FIGS. 3 and 4.

Also in this case, the outlet ducts 41A, 41B are substantially identical, i.e. they have the same length from the outlet ports 63A, 63B to the injection head 25 and present substantially the same cross-section. In this manner, it is guaranteed that the liquid pressure drops generated by these ducts are the same.

The upstream portions 61A, 61B extend through the piston body 43 along duct directions D1, D2 that are for example substantially parallel to each other, and advantageously substantially perpendicular to the piston axis A. By substantially parallel, it is meant that the two duct directions D1, D2 form an angle with each other that is smaller than 10°.

The upstream portions 61A, 61B have a substantially constant cross section along their length.

According to the embodiment shown in FIG. 3, the upstream portions 61A, 61B are for example substantially tangent to the wall 46.

According to the embodiment shown in FIG. 4, the piston device 120 differs by the shape of the outlet ducts 41A, 41B.

In this embodiment, the outlet ducts 41A, 41B are not tangent to the wall 46. On the contrary, the outlet ducts 41A, 41B respectively comprise an entrance portion 121A, 121B extending radially between the inner chamber 47 and the upstream portions 63A, 63B.

The entrance portions 121A, 121B are for example substantially perpendicular to the wall 46.

It should be noted that the injection device could comprise more than two outlet ducts, as long as the outlet ports of said ducts are arranged regularly around the piston axis and that said ducts are arranged to generate an equal liquid pressure drop between the outlet port and the injection head 25 during liquid injection into the preform 5. It should also be noted that, alternatively, the inlet port(s) could be placed in the uppermost area U of the wall 46 and the outlet port(s) could be placed in the lowermost area L of the wall 46.

According to the invention, the piston device comprises a recess portion 60 for performing CIP, as will be explained subsequently. The recess portion 60 extends in the inner chamber 47 between the sealing portion 49 and the complementary portion 51. Consequently, the recess portion 60 extends on an axial side of the sealing portion extending in the injection direction.

Figure 7:
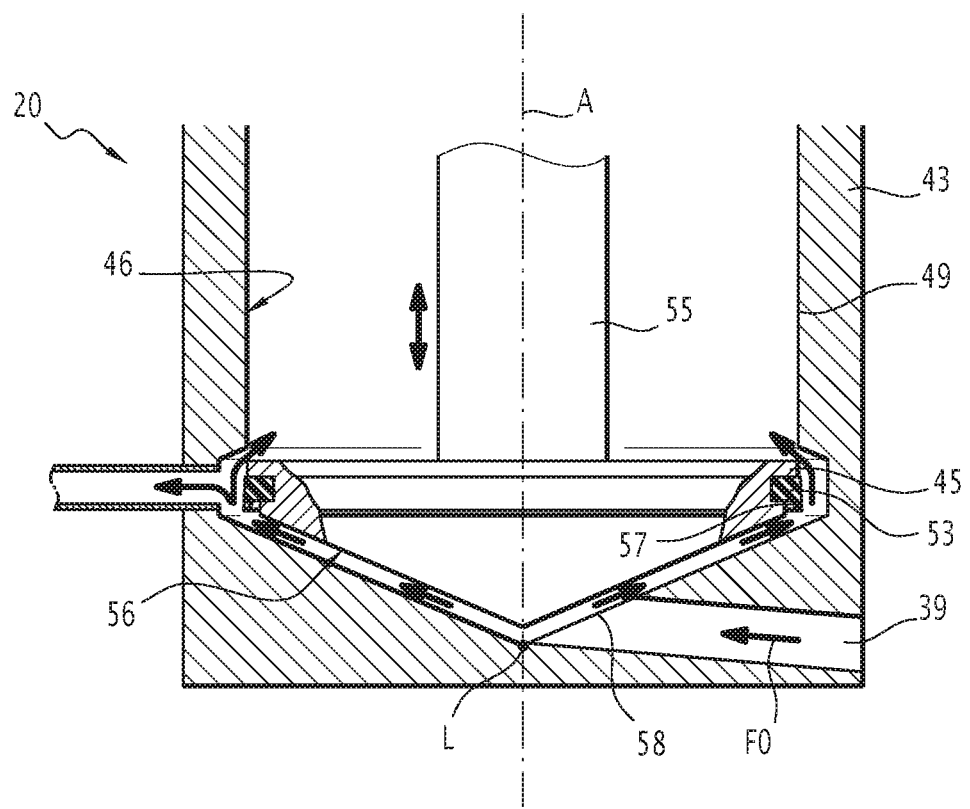
FIG. 7 is a detail of FIG. 6.

The recess portion 60 is arranged to locally enlarge the dimension of the inner chamber 47 in radial planes, i.e. to enlarge the diameter of the inner chamber 47 in case of an inner chamber 47 having a circular cross-section. More particularly, the dimension in radial planes of the recess portion 60 is arranged to be greater than the largest dimension of the piston head 45 in said radial planes such that, when the piston head 45 is placed in the recess portion 60, the piston head 45 is not in contact with the wall 46 of the piston body, as shown in FIGS. 6 and 7.

The recess portion 60 also has a height, measured along the piston axis A, that is greater than the height of at least the periphery of the piston head 45 measured along the piston axis A. In this manner, when the piston head 45 is placed in the recess portion 60, liquid can flow all around the piston head 45 as shown by the arrows of FIGS. 6 and 7. According to the embodiment shown in FIGS. 6 and 7, the periphery of the piston head 45, i.e. where the sealing gasket 53 is attached to the piston head 45, has a height inferior to the height of the recess portion 60 while the central part of the piston head 45, i.e. around the piston axis A, has a height greater than the height of the recess portion 60. In this manner and thanks to the conical shape of the contact surface 56 if the piston head 45, the liquid flowing against the contact surface is properly guided towards the sealing gasket 53, as shown by the arrows of FIG. 7.

The recess portion 60 has for example the shape of an annular groove, the axis of which coincides with the piston axis A and which extends all around the inner chamber 47.

According to a preferred embodiment, the recess portion 60 extends at the same height according to the piston axis A than the outlet port(s) 63A, 63B such that said outlet port or ports open in the recess portion 60. As explained previously, this embodiment allows reducing the space requirement of the piston device 20, 120. According to the embodiment shown in the figures, the recess portion 60 extends in the uppermost area U of the inner chamber 47. The functioning of the injection device 1 will now be described. Since the functioning is the same for all the embodiments described above, only the functioning of the injection device having two outlet ports 63A, 63B will be described in detail here.

The functioning is cyclical, as several preforms analogous to the preform 5 are successively filled and formed with the liquid 10 coming from the liquid source 15.

In production mode, first the preform 5 is brought in a filling position with respect to the injection head 25, wherein the preform is in liquid tight contact with the outlet 29 of the injection head.

The control rod 33 is in its sealing position, wherein the liquid present in the chamber 31 is prevented from exiting through the outlet 29.

The piston head 45 is in the extreme down sealed position shown in dotted lines in FIG. 2. The inner chamber 47 has its minimal volume. The inner chamber 47 is filled with liquid and is in fluidic communication with the liquid source 15.

As part of its reciprocation movement, the piston head 45 is moved toward the extreme up sealed position shown in solid lines in FIG. 2. The liquid 10 flows from the liquid source 15 into the expanding inner chamber 47 via the inlet duct 39, as symbolized by an arrow F0 in FIGS. 1 to 3.

Then the inlet duct 39 is closed and the control rod 33 is moved from its sealing position to the injecting position. The piston head 45 may be moved from the extreme up sealed position back toward its extreme down sealed position shown in dotted lines in FIG. 2 by moving the piston head 45 against the sealing portion 49 towards the complementary portion 51 in an injection direction. As the volume of the inner chamber 47 reduces, the liquid present in the inner chamber is pressurized for example up to 40 bar. The sealing gasket 53 prevents any leak upwards between the piston head 45 and the piston body 43. During the injection phase, the piston head 45 may move in said injection direction between any intermediary sealed position between the extreme up sealed position and the extreme down sealed position.

The liquid starts flowing toward the chamber 31 through each outlet port 63A, 63B, as shown by arrows F1, F2, and downstream into the preform 5 via the chamber 31.

Everywhere inside the inner chamber and in the upstream portion of the outlet ducts, the sum of the static pressure and of the dynamic pressure is constant or almost constant at any time. The liquid present in the inner chamber 47 presses by the static pressure against each part of the wall 46 with which said liquid is in contact. These parts of the wall 46 react by pressing on the liquid. However, in the areas corresponding to the outlet ports 63A, 63B, no or very little reaction occurs on the liquid, as the liquid "sees" no obstacle because the dynamic pressure is the main portion of the above constant.

The overall reaction of the wall 46 and the absence of reaction of the outlet ports 63A, 63B result in mechanical efforts applied by the liquid on the contact surface 56 of the piston head 45.

By arranging the outlet ports 63A, 63B in a regular manner around the piston axis A, the mechanical efforts are applied in an even manner on the contact surface 56 and are directed along a direction which is substantially parallel to the piston axis or are substantially equal to zero. This is due to the fact that the piston head 25 is moved in the injection direction with a speed which is high enough to create a static depressurization area close to each outlet port 63A, 63B. This depressurization defines for each outlet port a resultant vector of dynamic pressure originated at the outlet port centre, oriented along the flow path of the liquid entering the outlet duct and having an intensity more than half of the average pressure exerted on the piston head 45. The outlet ducts are sized and positioned with respect to the piston body such that the sum of the resultant vectors of dynamic pressure for each port is substantially coaxial to the piston axis A.

Consequently, during the movement of the piston head 45 in the injection direction, the piston head 45 is not urged laterally against the wall 46 of the inner chamber 47 and the sealing gasket 53 is not subjected to an unwanted stress. So the risk, particularly after some time, of damaging the sealing gasket 53 and experiencing potential hygiene issues is decreased.

Having substantially similar pressure drops respectively between the outlet ports 63A, 63B and the chamber 31 helps achieving this result.

The same results are achieved when the piston device comprises three or more outlet ducts that are arranged such that the outlet ports are angularly regularly positioned around the piston axis A and such that the pressure drops generated by the outlet ducts are equal.

After the preform 5 has been filled, the control rod 33 is put again in its sealing position and the preform is removed from its filling position.

Then, another cycle starts with another preform.

Thanks to the fact that the inlet port 58 is located in the inner chamber 47 in the lowermost area L, the inner chamber is easily drained by letting the liquid present in the inner chamber flow, for example by gravity, out of the inner chamber via the inlet duct.

Thanks to the fact that the outlet ports 63A, 63B are located in the uppermost area U of the inner chamber 47 at its minimal volume, air bubbles initially present in the inner chamber 47 are easily removed by flowing the liquid though the inner chamber via the outlet ducts 41A, 41B during an air purge operation as explained previously.

When CIP has to take place, for example when the liquid filling the container has to be changed or at regular interval, the injection device is arranged for driving the piston head (45) in the recess portion 60 in a CIP configuration. In this position, a cleaning liquid injected through the inlet port 58 is able to flow all around the piston head, as shown in FIGS. 6 and 7, and to clean all parts of the piston device, and in particular the sealing gasket 53. The cleaning liquid comes from a liquid source placed in fluidic communication with the inner chamber 47 via the inlet duct 39.

Placing the recess portion 60 in the inner chamber below the sealing portion 49, in addition to allow saving space, helps preserving the sealing gasket 53. When the piston head 45 is moved in the recess portion 60, the lip 57 of the sealing gasket 53 is freed from its contact with the sealing portion and can be cleaned properly because of the turbulent liquid flow about the sealing gasket. To increase the turbulences in the liquid flow, the piston head may have a small reciprocating movement inside the recess portion 60.

Moving back the piston head 45 against the sealing portion is obtained by moving the piston head 45 in a direction opposite the injection direction, i.e. in an upward direction in the embodiments described above. During this movement, the end of lip 57 attached to the sealing gasket 53 enters first in contact with the sealing portion and the lip 57 is progressively applied against the sealing portion without the risk of turning the lip upside down as it is the case when the recess portion is placed above the piston head 45.

CIP can also comprise a step of reciprocating the piston head 45 against the sealing portion while a cleaning liquid is injected through the inlet port 58.

The liquid source is filled with cleaning liquid (in spite of beverage during the production mode). The turbulence of the cleaning liquid when the piston head is in the recess portion 60 provides efficient cleaning. The turbulence is mainly due to a main CIP circulation flowing from the inlet, passing through the recess, flowing through the outlet ducts, and the injection head 25. A dummy container, or dummy bottle, placed in fluidic communication with the outlet 29 of the injection head 25, collects the cleaning liquid, which is arranged to flowback to the liquid source by placing the dummy container in fluidic communication with said liquid source.

In another CIP circulation, the cleaning liquid flows from the inlet 39, passes through the recess 60, the outlet ducts 41A, 41B, 241A, 241B, 241C and the injection chamber 31, and comes back to the liquid source through a first auxiliary port 401, a first auxiliary valve 402 and a first auxiliary duct 403.

In a further CIP circulation, the cleaning liquid flows from the inlet 39, passes through the recess 60 and cleans the upper side of the piston head and of the piston body and come back to the liquid source through a second auxiliary port 404, a second auxiliary valve 405 and a second auxiliary duct 406.

A strong advantage of having the CIP recess inside the inner chamber 47 and bellow the sealing portion is to allow large reciprocation of the piston head. This provides large liquid turbulences of the cleaning liquid and a very efficient CIP.

A further advantage of said particular arrangement of the CIP recess is that the various cleaning liquid circulations can all use the same inlet. In the traditional CIP recess (outside the inner chamber used for production configuration), the cleaning liquid had to be provided alternatively through the inlet 39 and then through the second port 404. The CIP recess of the current embodiment allows much simpler and less expensive valves system for managing the various CIP circulations.

The invention claimed is:

1. An injection device for a forming and filling station for forming a preform into a container and filling the container using a pressurized liquid, the injection device comprising:
   at least one injection head for injecting the pressurized liquid into the preform, and
   at least one piston device having a piston body and a piston head arranged to reciprocate in the piston body along a piston axis, the piston head being in a liquid tight contact with a sealing portion of the piston body so as to fluidly isolate an inner chamber of the piston device, the piston body having an inlet duct in fluidic communication with a liquid source for admitting liquid into the inner chamber and at least one outlet duct fluidly communicating the inner chamber with the injection head, the piston body including a recess portion defining a location where the piston head is not in liquid tight contact with the piston body such that liquid can flow from the inner chamber to a part of the piston body extending on a side of the piston head opposite the inner chamber, the injection device being arranged for driving the piston head in the recess portion in a cleaning in place configuration,
   the recess portion extending within the inner chamber on an axial side of the sealing portion in the injection direction.

2. The injection device according to claim 1, wherein the recess portion is an annular groove extending around the inner chamber and locally enlarging the radial dimension of the inner chamber measured perpendicularly to the piston axis.

3. The injection device according to claim 1, wherein the height of a periphery of the piston head measured along the piston axis is inferior than the height of the recess portion measured along the piston axis.

4. The injection device according to claim 1, wherein the piston head includes a sealing gasket providing liquid tight contact between the piston head and the sealing portion, the sealing gasket having a lip oriented towards the inner chamber such that the lip can be applied against the sealing portion without being turned over when the piston head is moved from the recess portion to the sealing portion.

5. The injection device according to claim 1, wherein the inlet duct and the outlet duct respectively define an inlet port and an outlet port in a wall of the inner chamber.

6. The injection device according to claim 5, wherein the outlet port opens into the recess portion.

7. The injection device according to claim 5, wherein the piston head is designed to occupy an extreme down sealed position with respect to the piston body during reciprocation, the inner chamber having a volume that is minimal when the piston head is in the extreme down sealed position, wherein at least one of the inlet port and the outlet port opens at a lowermost area of the inner chamber and at least another of the inlet port and outlet port is located at an uppermost area of the inner chamber when the piston head is in the extreme down sealed position.

8. The injection device according to claim 7, wherein at least one outlet port is located at an uppermost area of the inner chamber when the piston head is in the extreme down sealed position.

9. The injection device according to claim 5, wherein the piston body comprises at least two outlet ducts fluidly communicating the inner chamber with the injection head, each outlet duct having an outlet port centered on an outlet port center, wherein all the outlet port centers extend in the same radial planes of the inner chamber at the same distance from the piston axis and are arranged angularly in a regular manner around the piston axis, the angle formed by two successive outlet ports with the piston axis being constant.

10. The injection device according to claim 1, further comprising a first auxiliary duct fluidly communicating the injection head with the liquid source.

11. The injection device according to claim 1, further comprising a second auxiliary duct fluidly communicating the part of the piston body extending on the side of the piston head opposite the inner chamber with the liquid source.

12. A method for cleaning an injection device having an injection head fluidly coupled to a piston device, the method, comprising the following steps:
   placing a liquid source containing a cleaning product in fluidic communication with an inner chamber defined in the piston device via the inlet duct,
   reciprocating a piston head in a piston body of the piston device to circulate the cleaning product from the liquid source to the injection head, placing the piston head in a recess portion of the piston body such that the cleaning product can flow from the inner chamber to a part of the piston body extending on the side of the piston head opposite of the inner chamber.

13. The method according to claim 12, wherein a dummy container is placed in fluidic communication with an outlet of the injection head and with the liquid source such that the cleaning product flowing through the outlet flows back to the liquid source via the dummy container.

14. The method according to claim 12, further comprising a step of circulating the cleaning product back to the liquid source via the inner chamber, the injection head and a first auxiliary duct fluidly communicating the injection head with the liquid source.

15. The method according to claim 14, further comprising a step of circulating the cleaning product from the liquid source back to the liquid source via the inner chamber, a part of the piston body extending on a side of the piston head opposite the inner chamber and a second auxiliary duct fluidly communicating the side of the piston head opposite of the inner chamber with the fluid source.

* * * * *